United States Patent

Miyakawa et al.

[15] 3,643,224

[45] Feb. 15, 1972

[54] CENTRALIZED MESSAGE ASSEMBLER

[72] Inventors: Takashi Miyakawa; Tomio Kurita; Akira Ichimura, all of Tokyo, Japan

[73] Assignees: Nippon Telegraph & Telephone Public Corporation; Nippon Electric Company Limited, Tokyo, Japan

[22] Filed: July 29, 1969

[21] Appl. No.: 845,816

[30] Foreign Application Priority Data

July 31, 1968 Japan....................................43/54543

[52] U.S. Cl...........................................................340/172.5

[51] Int. Cl...........................................................H04m 3/50

[58] Field of Search.......................340/172.5, 152; 235/157; 179/27 FG

[56] References Cited

UNITED STATES PATENTS

| | | | |
|---|---|---|---|
| 3,133,268 | 5/1964 | Avakian et al. | 340/172.5 |
| 3,305,839 | 2/1967 | Looschen et al | 340/172.5 |
| 3,337,847 | 8/1967 | Olsson et al. | 340/172.5 |
| 3,347,989 | 10/1967 | Riddell | 340/172.5 |
| 3,381,278 | 4/1968 | Knoll et al. | 340/172.5 |

*Primary Examiner*—Gareth D. Shaw
*Attorney*—Marn & Jangarathis

[57] ABSTRACT

A message-reporting system is disclosed in accordance with the teachings of the present invention wherein compiler means located at a central office assembles a plurality of complete messages from message fragments stored on a recording medium in accordance with a plurality of message request signals generated by a plurality of subscribers. The message request signals correspond to predetermined conditions which may be established at a plurality of subscriber stations associated with a plurality of local offices. Each local office is comprised of means for storing the message request signals, means for reading out the appropriate stored message request signals in response to the occurrence of the predetermined conditions and means for transmitting the message request signals to the central office where the message request signals are used to control the compiler means.

8 Claims, 4 Drawing Figures

INVENTORS
Takashi Miyakawa
Tomio Kurita
Akira Ichimura
BY
Marn & Jangarathis
ATTORNEYS INVENTORS
Takashi Miyakawa
Tomio Kurita
Akira Ichimura
BY
Marn & Jangarathis
ATTORNEYS

CENTRALIZED MESSAGE ASSEMBLER

This invention relates to message-reporting systems wherein a message is transmitted to a subscriber in response to a predetermined condition and, more particularly, to an automatic, prerecorded message-reporting system wherein the message is transmitted from a central location to a plurality of local subscriber stations in response to a condition established by a subscriber.

Message-reporting systems are widely used in telephone communications networks where the message may comprise a weather forecast or time-of-day announcement that is transmitted to a subscriber who calls a preassigned telephone number. Further, a message may be transmitted to a subscriber to apprise him of a wrong or misdialed number, or that the telephone number he called has been changed to a new number. This latter message may be part of the so-called "intercept" service provided by public telephone companies to their subscribers. Indeed, the subscribers need not necessarily be telephone subscribers but may be subscribers to a data processing service, a teleprinter service, or any other communications service wherein message reporting is desired.

Conventional message-reporting systems of the type commonly adapted for use with telephone communications networks may be classified into two general categories, i.e., manual systems and automatic systems. The manual system employs operators to orally recite a message to a subscriber in response to the appropriate condition such as calling a nonoperating number or requesting time or weather information. Although the manual system has a high quality of performance, the requisite personnel expense is large.

The automatic message-reporting system that is conventionally used employs a recording medium such as magnetic tape, or a magnetic drum, at each local telephone office. The appropriate message is prerecorded on the recording medium and is played back to a local subscriber in response to his call. The automatic system is limited in the number of messages that may be recorded, and, therefore, limited in the total number of message services that may be provided by the capacity of the recording medium. The messages are limited to formal readymade announcements which may be used for any subscriber, such as time announcements, weather forecasts, and information regarding nonworking telephone numbers. In addition, the automatic system is inflexible in that a subscriber's requirements may be satisfied only to the extent of the prerecorded message. A demand, for which there is no prerecorded announcement, such as the identity of a new telephone number, must be manually provided by an operator. Further, since the automatic system is installed at local telephone offices, the large number of such offices results in high installation costs.

Therefore, it is an object of the present invention to provide a message reporting system that automatically transmits messages to subscribers.

It is an additional object of this invention to provide a message reporting system wherein the contents of the messages may be easily changed.

It is another object of the present invention to provide an automatic message-reporting system adapted for use in communications switching networks that serves a plurality of subscribers from a centralized location.

It is yet another object of this invention to provide a message-reporting system that assembles and transmits a complete message from prerecorded message fragments.

It is another object of this invention to provide a message reporting system wherein an electronic computer may provide a source of message fragments.

It is still another object of this invention to provide a message reporting system that assembles a message from prerecorded message fragments in accordance with a request for a message from a subscriber.

Various other objects and advantages of the invention will become clear from the following detailed description of an embodiment thereof, and the novel features will be particularly pointed out in connection with the appended claims.

In accordance with this invention, apparatus is provided wherein message fragments are assembled into complete messages and transmitted from a central location to a plurality of distant subscribers over existing communications networks in response to requests for messages from the subscribers; the requests may take the form of coded signals, automatically produced upon the occurrence of predetermined conditions.

The invention will be more clearly understood by reference to the following detailed description of an embodiment thereof in conjunction with the accompanying drawings in which.

Figure 1:
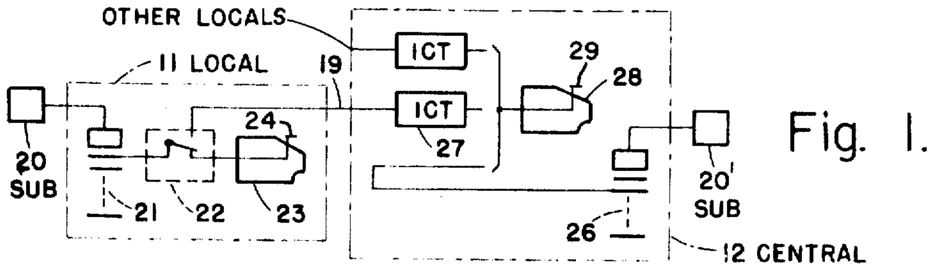
FIG. 1 is a block diagram of a conventional manual message-reporting system adapted for use in a telephone communications network.

Referring now to the drawings, and in particular to FIG. 1, there is shown a conventional manual message-reporting system comprising a central office 12, a plurality of local offices 11, only one of which is shown, a plurality of subscribers 20, interoffice trunklines 19, and operator's positions 23 and 28. The central office 12 may be a telephone central office, and is connected by telephone trunklines 19 to a plurality of local offices 11. Although only one local office is shown in FIG. 1, there may be more than 100 such local offices associated with a single central office. A plurality of subscribers 20, such as telephone subscribers, are coupled to local office 11 by conventional connector switches 21. The connector switches 21 are commonly used in step-by-step switching equipment and may comprise crossbar switches, ferreed switches, or other well-known switches. Connector switches 21 are coupled to transfer switches 22. Transfer switches 22 connect subscribers 20 through the connector switches 21 to either trunklines 19 or local office operator position 23 in a manner hereinafter explained. Trunklines 19 couple local offices 11 to the central office operator position 28 at central office 12 through the incoming trunklines 27. Central office subscribers 20' may be connected to the central office operator position 28 by connector switches 26. Operator positions 23 and 28 enable the telephone operator to communicate directly with a subscriber.

A description of the operation of the apparatus of FIG. 1 will now be set forth for the case of a subscriber calling a telephone number that has been changed. It will be understood, however, that the apparatus operates in the same manner if a subscriber calls a telephone number reserved for time announcements, weather forecasts, etc. After the subscriber has dialed the telephone number and the automatic switching equipment (not shown) has found it impossible to connect the subscriber with the dialed number, subscriber station 20 is connected to operator position 23 through connector switches 21 and transfer switch 22. Upon receiving the call, the operator at position 23 depresses key 24 and asks the subscriber what number he dialed. Upon receiving the necessary information from him, the operator consults a telephone directory and then informs the subscriber of the new telephone number. If the calling subscriber is located at subscriber station 20', his call would be routed to operator position 28 by connector switches 26 after automatic switching equipment (not shown) associated with central office subscribers has determined that a connection to the dialed telephone number cannot be made.

Local office operator position 23 is used to transmit messages to the calling local subscribers 20 during periods of peak telephone use, as in daylight hours. When telephone traffic is light, as at night, local subscribers 20 are connected to central office operator position 28 by transfer switch 22 which couples connector switches 21 to incoming trunklines 27 through trunkline 19. Fewer operators are needed during light traffic hours and operator position 28 services local office subscribers 20 as well as central office subscribers 20' during those hours.

Figure 2:
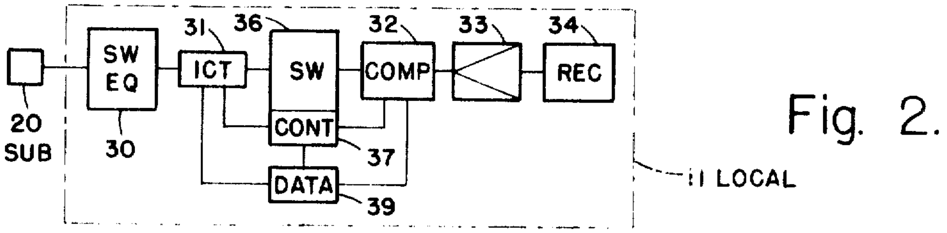
FIG. 2 is a block diagram of a conventional automatic message-reporting system.

Referring to FIG. 2, a block diagram of a prior art automatic message-reporting system is shown, comprising local subscribers 20, compilers 32, recording medium 34, control equipment 37 and message data source 39, all located at local office 11. Subscribers 20 are connected to incoming trunklines 31 by well-known automatic switching equipment 30 which may be step-by-step or common control switches. Common control switches 36, such as crossbar switches for instance, selectively interconnect the incoming trunklines 31 with a message compiler 32, thereby coupling subscriber 20 thereto. Message fragments, which may be isolated digits, words, phrases, etc., are stored on audio-recording medium 34, which may be a magnetic tape recorder, and are coupled to compiler 32 by audio amplifier 33. Compiler 32 which may be a well-known tape drive and readout device, assembles selected ones of the message fragments into a complete verbal message and transmits the message to subscriber 20 through common control switches 36, incoming trunklines 31, and automatic switching equipment 30. Message data source 39 is connected to incoming trunklines 31 and compiler 32, and receives calling number information from subscriber 20 through incoming trunklines 31. The calling number information is used by message data source 39 to control compiler 32 to assemble the proper message in accordance with that information. A more detailed description of message data source is set forth hereinafter. Control equipment 37 is connected to incoming trunklines 31, compiler 32 and common control switches 36, and supervises the connection between an incoming trunkline and a compiler 32. Control equipment 37 is also connected to message data source 39 and controls the operation thereof.

The operation of the automatic message transmission system illustrated in FIG. 2 is now described. It will be assumed, for purposes of simplifying the explanation, that subscriber 20 has dialed a number that has been changed to a new operating number. However, as will be presently understood, the prior art system functions in the same manner if subscriber 20 requests a time announcement, weather forecast, etc. After automatic-switching equipment 30 has determined that the dialed number is no longer in operation, it will connect subscriber 20 to one of the incoming trunklines 31. Connection to incoming trunkline 31 causes common control equipment 37 to search for an idle compiler 32. Upon finding an idle compiler, common control equipment 37 reserves the compiler for subsequent connection to subscriber 20 through common control switches 36. Common control equipment 37 also initiates operation of message data source 39. Message data source 39 receives the calling number information transmitted by subscriber 20, which is the telephone number that was dialed. In response to this information, message data source 39 controls compiler 32 to assemble an appropriate message from message fragments stored on a recording medium 34. The message includes the telephone number dialed by subscriber 20 and the new telephone number, thereby apprising subscriber 20 of the change in operating numbers. Message data source 39 may comprise well-known logic circuitry that generates instruction signals in response to input signals.

Compiler 32 assembles a complete message from the stored message fragments pursuant to the instructions from message data source 39. If the message fragments are prerecorded on magnetic tape, compiler 32 may comprise well-known drive equipment commonly associated with magnetic tape memory banks used with large scale multipurpose digital computers. Once the message is assembled, control equipment 37 actuates common control switches 36 to complete the connection between subscriber 20 and compiler 32, and the message is verbally transmitted to subscriber 20. Message data source 39 may instruct compiler 32 to assemble a message such as "The number you have dialed, 451-2361, has been changed to a new number, 453-2111, please dial again," from the message fragments prerecorded on magnetic tape 34. It is understood that message data source 39 instructs compiler 32 to assemble an appropriate message from the prerecorded message fragments in accordance with the calling number information transmitted by subscriber 20. If subscriber 20 requested weather information, for example, by dialing the local telephone number reserved for weather forecasts, the calling number information received by message data source 39 from subscriber 20 through automatic switching equipment 30 and incoming trunkline 31 would cause message data source 39 to instruct compiler 32 to assemble a message such as "The weather forecast for today is..." from the prerecorded message fragments. Thus, message data source 39 instructs compiler 32 to assemble a message in accordance with the information received from subscriber 20.

Figure 3:
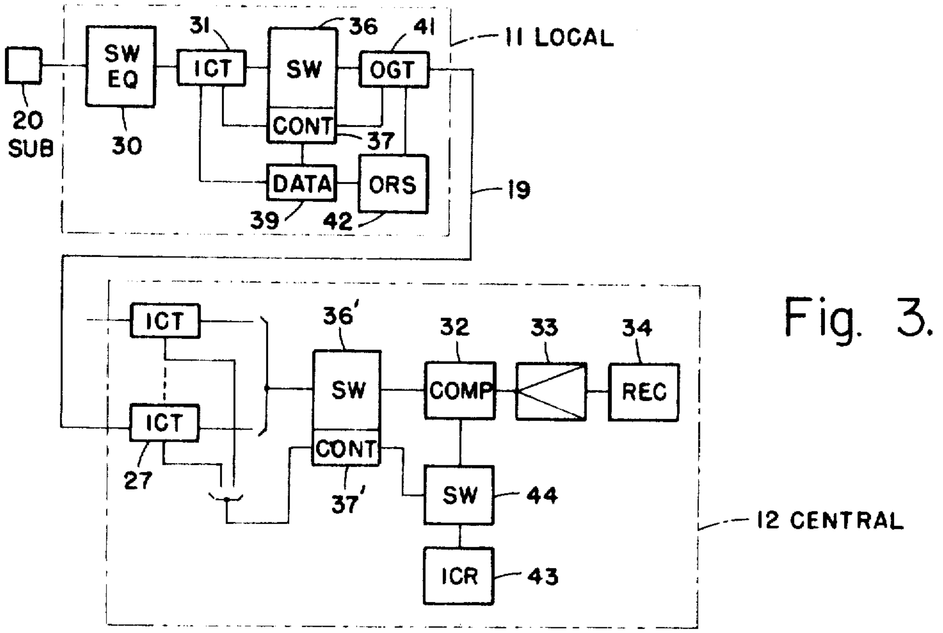
FIG. 3 is a block diagram of an embodiment of the present invention.

As was mentioned above, one of the disadvantages of the prior art message reporting system is the requirement of installing a compiler, recording medium, and associated circuitry at each local office 11. FIG. 3 is an embodiment of the present invention wherein only a single central location is required for the installation of the compiler and recording medium, which may thereby serve a plurality of local offices 11, each with a plurality of subscribers 20. Each local office 11 comprises automatic switching equipment 30, control equipment 37, message data source 39 and a plurality of originating register senders 42. Central office 12 comprises a plurality of incoming trunklines 27, control equipment 37', a plurality of incoming registers 43, a plurality of message compilers 32, and recording medium 34. Like reference numerals are used in FIGS. 2 and 3 to identify identical blocks which represent similar devices. Local office 11 is arranged such that subscriber 20 is coupled to outgoing trunklines 41 through automatic-switching equipment 30, incoming trunklines 31 and common control switches 36, in the manner described above with respect to FIG. 2. Message data source 39 is connected to incoming trunklines 31, and originating register senders 42, and receives calling number information from subscriber 20 through incoming trunklines 31. The calling number information is used by message data source 39 to control compiler 32, located at central office 12, to assemble the proper message in accordance with that information, as aforesaid. The data signals produced by message data source 39 and transmitted to control compiler 32 are stored in originating register sender 42, which may be any well-known storage device such as a shift register, until the connections between local office 11 and central office 12 have been established. Control equipment 37 is connected to incoming trunklines 31, outgoing trunklines 41 and common control switches 36, and supervises the connection between an incoming trunkline and an outgoing trunkline. Control equipment 37 is also connected to message data source 39 and controls the operation thereof.

Outgoing trunklines 41 of local office 11 are connected to incoming trunklines 27 of central office 12 by interoffice trunkline 19. Common control switches 36', which are similar to local office common control switches 36, connect incoming trunklines 27 to an idle compiler 32 in the well-known manner. Control equipment 37' is connected to incoming trunklines 27, common control switches 36' and to compiler 32 through switch 44, and supervises the connection between incoming trunklines 27 and compiler 32. The data signals produced by message data source 39 in accordance with the calling number information generated by subscriber 20 are transferred from originating register sender 42 in local office 11 to incoming register 43 in central office 12 via outgoing trunklines 41, interoffice trunkline 19, incoming trunklines 27, control equipment 37' and switch 44. When control equipment 37' has located an idle compiler, selected message fragments stored on recording medium 34, which may be similar to the recording medium described with respect to FIG. 2, or may be the recording memory device conventionally associated with an electronic computor, are read out through audio amplifier 33 and assembled into a complete message by compiler 32 in the manner described above. The complete message is then transmitted to subscriber 20 through the connections comprising common control switches 36′, incoming trunklines 27, interoffice trunkline 19, outgoing trunklines 41, common control switches 36, incoming trunklines 31, and automatic switching equipment 30. The compiler 32 may be similar to that described in the paper, "Automatic Telephone Intercept System" by Abbot and Bence, IEEE Transactions on Communication Technology, Vol. COM-13, No. 4, pages 395–399, Dec., 1965.

Further equipment may be installed at central office 12 to provide message reporting transmission to central office subscribers. The further equipment, although not shown, may comprise automatic switching equipment, such as automatic switching equipment 30, to interconnect a central office subscriber with an incoming trunkline such as incoming trunklines 27. A message data source, such as message data source 39, would produce data signals to control compiler 32 to assemble a proper message from message fragments stored on recording medium 34 in accordance with the calling number information of a central office subscriber.

Operation of the apparatus represented by the block diagram of FIG. 3 will be described for the illustrative example of subscriber 20 dialing a number that has been changed to a new number. However, it will be clear that the apparatus operates in a similar manner for other message reporting transmission such as time announcements, weather forecasts, etc., that may be associated with a particular telephone number. It will also be assumed that subscriber 20 is a local office subscriber; but, as will be apparent from the following example, subscriber 20 may be a central office subscriber.

After subscriber 20 has completed the dialing operation, automatic-switching equipment 30 determines, in the well-known manner, that the dialed number has been changed and couples subscriber 20 to incoming trunkline 31. Control equipment 37 detects the coupling of subscriber 20 to incoming trunkline 31 and, as is well known to one skilled in the telephone switching art, searches for an idle outgoing trunkline 41, and initiates operation of message data source 39. Message data source 39 is connected to subscriber 20 through incoming trunklines 31 and detects the calling number information which consists of the dialed digits transmitted by subscriber 20. The calling number information is used, in a manner subsequently described, by message data source 39 to generate data signals which identify the number dialed by subscriber 20, identify the new number, and instruct compiler 32 to assemble an appropriate message in accordance with the data signals. The data signals generated by message data source 39 are stored in originating register sender 42 until an idle compiler 32 in central office 12 has been located. Once the data signals are stored in originating register sender 42, control equipment 37 causes common control switches 36 to connect subscriber 20 to an incoming trunkline 27 in central office 12 through automatic switching equipment 30, incoming trunkline 31, common control switches 36, outgoing trunkline 41 and interoffice trunkline 19. Control equipment 37′ in central office 12 detects the connection of subscriber 20 to an incoming trunkline 27 and searches for an idle compiler 32. When an idle compiler 32 is seized, common control switches 36′ couple the incoming trunkline 27 to the seized compiler 32. Control equipment 37′ also searches for an idle incoming register 43. When an idle incoming register 43 is located, switch 44 operates to connect the located register 43 to seized compiler 32. Completion of the connection between incoming register 43 and compiler 32 initiates the transmission of the data stored in originating register sender 42 through outgoing trunkline 41, interoffice trunkline 19, incoming trunkline 27, common control switches 36′, compiler 32 and switch 44 to incoming register 43. Incoming register 43 may be any well-known data storage device such as a shift register, and is similar in construction to outgoing register sender 42 which is described in more detail below. After the data signals, which control compiler 32 to assemble an appropriate message, are received by incoming register 43 and stored therein, originating register sender 42 at local office 11 is disconnected from outgoing trunkline 41. The data signals stored in incoming register 43 are coupled to compiler 32 by switch 44, and control compiler 32 to assemble a complete message from message fragments recorded on recording medium 34 in the manner described above with reference to FIG. 2. The assembled message is transmitted to subscriber 20 through the aforesaid completed connections, and incoming register 43 is disconnected from compiler 32. Thus, the message reporting system illustrated in FIG. 3 operates in an improved manner from that of the system of FIG. 2, and the central location of compiler 32 and recording medium 34 reduces the high installation costs necessitated by the prior art which located the compilers and recording media at the many local offices.

Figure 4:
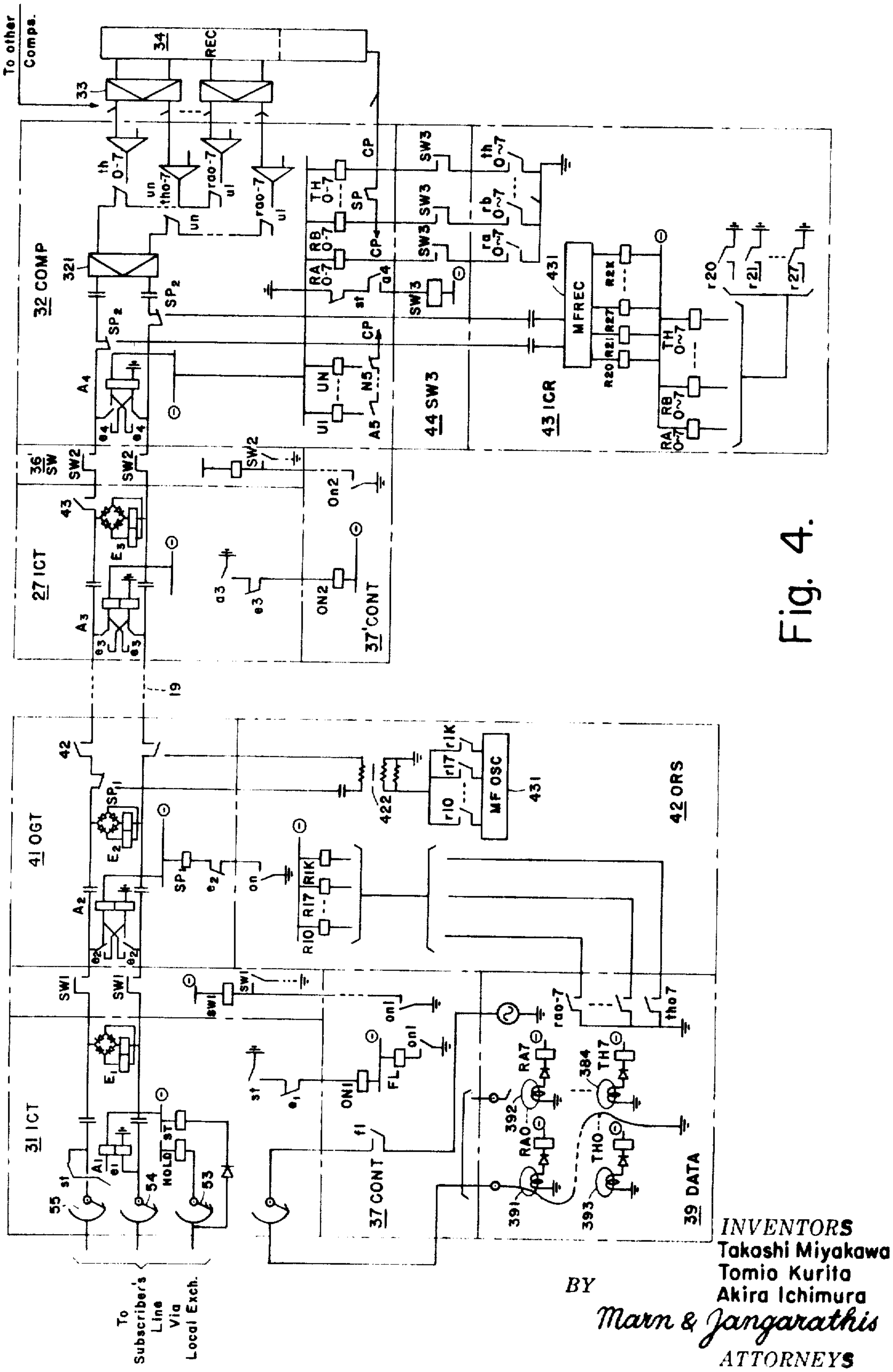
FIG. 4 is a schematic diagram of a portion of the blocks illustrated in FIG. 3.

FIG. 4 shows, in schematic form, the blocks illustrated in FIG. 3 and comprises incoming trunklines 31, message data source 39, common control switches 36, originating register sender 42, outgoing trunklines 41, incoming register 43, compiler 32 and recording medium 34. Incoming trunklines 31 are comprised of four rotary switches 51, 53, 54 and 55, each of which switches is adapted to be operable with a plurality of subscribers, such as 50 subscribers for example, coupled to the banks of said switch means. Switches 53–55 scan lines C, B and A, respectively, which are connected to automatic switching equipment 30 of FIG. 3, and on which appear calls from subscribers requesting message reporting. When such a call appears, rotary switches 53, 54 or 55 seize the lines by the well-known operation of actuating starting relay ST to close contacts ST. Negative and ground potential appear on lines B and C respectively, thereby causing the lower half of speech current supply relay $A_1$ and holding relay HLD to operate. Operation of holding relay HLD halts the rotary motion of the seizing rotary switch. The starting relay ST also operates common control switches 37 to actuate common control switches 36 to close so as to interconnect the designated incoming trunkline 31 with a selected outgoing trunkline 41, depending upon the operation of speech current supply relay $A_2$.

Control equipment 37 comprises contacts *tl* connecting lead 52, and relays TL and ON1. When the starting relay ST operates, relay ON1 is activated to close contacts $on_1$ which activates relay TL, closing contacts *tl*, thereby applying current from source 56 through rotary switch 51 to connecting lead 52. The current in lead 52 activates message data source 39 which comprises a memory core having memory elements 391–394 arranged in rows and columns in the well-known manner, and related circuits including relays $R_1A0—R_1A9$, ..., $T_1H0—T_1H9$. The data stored in the memory elements are the new number information and instructions for compiler 32 to assemble an appropriate message from the message fragments stored on recording medium 34. The calling number information provided by subscriber 20 is used to read out the data stored in the memory elements associated with that called number in a manner well known to those skilled in the memory core art. The readout data is translated to originating register sender 42 by relay contacts $r_1a0—r_1a9$, ..., $t_1h0—t_1h9$ of message data source 39.

Originating register sender 42 comprises relays $R_10—R_1K$ and multifrequency oscillator 421 which may be any well-known oscillator that generates a plurality of frequencies, or a plurality of single-frequency oscillators. The information transferred from message data source 39 by the aforesaid relay contacts actuate relay coils $R_10—R_1K$ of originating register sender 42. The actuated relay coils selectively close contacts $r_10—r_1K$ so that a frequency-coded data signal is transmitted through transformer 422 to contacts *b* of split relay contacts $sp_1$ in outgoing trunkline 41. Contacts $sp_1$ are closed to position *b* by the split relay (not shown) and the frequency-coded data signal is transmitted to incoming trunkline 27 by interoffice trunkline 19. Incoming trunkline 27 includes speech current supply relay $A_3$ which operates to activate control equipment 37′. As aforesaid, control equipment 37′ connects an idle compiler 32 to incoming trunkline 27 through common control switches 36′. Accordingly, control equipment 37' includes relay ON2, activatable through contacts $a_3$, to close contacts $on_2$ which in turn, operates relay SW2 of common control switches 36'.

A split relay at the central office 12 operates in the well-known manner and split relay contacts $sp_2$ in compiler 32 close to position *b* thereby connecting incoming trunkline 27 to incoming register 43. This connection permits the frequency-coded data signal generated by multifrequency oscillator 421 to be received by multifrequency receiver 431. Multifrequency receiver 431 may be any well-known frequency decoder that produces a signal in response to a discrete frequency and may include a plurality of tuned circuits, each circuit tuned to a separate frequency. The coded frequency signal received by multifrequency receiver 431 is decoded thereby and, through a relay array comprised of relays $R_2$0—$R_2$K and relays $R_2$A0—$R_2$A7, ... $R_2$B0—$R_2$B7, ... $T_2$H0—$T_2$H7, the decoded data signal operates compiler 32 in the well-known manner to assemble a message in accordance with the data.

Compiler 32 is comprised of contacts $U_1$—$U_n$, amplifier 321, relays $R_3$A0—$T_3$H7 and the aforementioned contacts $sp_2$. Relays $R_3$A0—$T_3$H7 are connected to incoming register 43 and receive the data signals therefrom which actuate the said relays. The contacts of the actuated relays, not shown, operate in the familiar manner to selectively read out the prerecorded message fragments stored on recording medium 34. Contacts $U_1$—$U_n$ connect audio amplifiers 33 to amplifier 321 and the assembled message is transmitted to incoming trunkline 27 by contacts $sp_2$ which return to position *a*.

A more detailed description of the operation of the apparatus shown in the schematic diagram of FIG. 4 now follows for the assumed example of subscriber 20 dialing a telephone number that has been changed. It is further assumed that automatic switching equipment 30 has connected subscriber 20 to incoming trunkline 31, and control equipment 37 has actuated common control switches 36 to connect incoming trunkline 31 with outgoing trunkline 41 in the manner described above. The memory core array of message data source 39, comprised of elements 391—394, has stored therein data relating to the number dialed by subscriber 20. This data may include the identity of the dialed number, the new telephone number and the appropriate instructions commonly employed in magnetic tape readout systems that are well known in the digital computer art. When closure of contacts *st* activates relay TL of control equipment 37 to close contacts $t_1$, the telephone number dialed by subscriber 20 and transferred to incoming trunkline 31 is extended to message data source 39 by connecting lead 52 whereupon current flows from source 56 through contacts *t*1, rotary switch 51 and readout lead threaded through the elements 391—394, thereby reading out the above-described data from the memory core array. Rotary switch 51 is rotated to a position corresponding to the dialed telephone number. As is well known in the memory core art, only the data corresponding to the dialed telephone number will be read out of the memory core. Each relay coil $R_1$A0—$R_1$A9,...$T_1$H0—$T_1$H9 is connected to a corresponding memory element and the readout data activates the appropriate relays. Each activated relay coil operates an associated relay contact $r_1a0$—$r_1a9$, ... $t_1h0$—$t_1h9$ and the operated contacts transfer the readout data to relay coils $R_1$0—$R_1$K in originating register sender 42. It is seen that the data is inherently in digital form and thus may be transferred merely by opening or closing a relay contact. Contacts *t*1 resume the open condition upon the transfer of data. The closed contacts $r_1a0$—$t_1h9$ activate relay coils $R_1$0—$R_1$K, and the activated coils close relay contacts $r_1$0—$r_1$K. A distinct frequency generated by multifrequency oscillator appears at each of relay contacts $r_1$0—$r_1$K, and the closed contacts apply the frequencies thereat to contacts $sp_1$ of outgoing trunkline 41. Contacts $sp_1$ have closed to position *b* in response to the activation of relay $SP_1$ by closing contacts *on*. It is recalled that contacts *on* are closed when contacts *st* close to excite relay ON1. Thus, each distinct frequency indicates a closed relay contact $r_1$0—$r_1$K, and each closed relay contact $r_1$0—$r_1$K represents the data readout of message data source 39 and transferred to originating register sender 42. Consequently, data is transmitted from local office 11 over interoffice trunkline 19 to central office 12 in a coded frequency format.

Concurrently with the reading out of the data stored in message data source 39, an incoming trunkline 27 at central office 12 is seized and a compiler 32 is connected thereto by common control switches 36' at central office 12. This occurs when incoming trunkline 27 receives a frequency-coded signal from originating register sender 42 via outgoing trunkline 41. The received signal activates relay A3 to close contacts *a*3 of control equipment 37'. Hence, relay ON2 is excited to close contacts *on*2, thereby actuating relay SW2. It is observed, therefore, that contacts *sw*2 of common control switches 36' close to connect compiler 32 with incoming trunkline 27. After compiler 32 is so connected, contacts $sp_2$ close to their *b* positions, thereby completing a path from multifrequency oscillator 421 in originating register sender 42 to multifrequency receiver 431 in incoming register 43. The path comprises closed relay contacts $r_1$0—$r_1$K, transformer 422, contacts $sp_1$, interoffice trunkline 19, incoming trunkline 27, common control switches 36', and contacts $sp_2$. In addition, relay A4 is activated by the received signal to close contacts *a*4. Multifrequency receiver 431 generates digital output signals in accordance with the received coded frequencies. The output signals activate selected ones of relay coils $R_2$0—$R_2$K. These relay coils correspond to relay coils $R_1$0—$R_1$K in incoming register sender 42. Activated relay coils $R_2$0—$R_2$K close relay contacts $r_2$0—$r_2$K and the data received by multifrequency receiver 431 is thus translated to relay coils $R_2$A0—$R_2$A7, ... $R_2$B0—$R_2$B7, ... $T_2$H0—$T_2$H7 by the closing of relay contacts $r_2$0—$r_2$K. The data translated to relay coils $R_2$A0—$T_2$H7 is identical to the data readout of message data source 39 by relay coils $R_1$A0—$T_1$H9. The data thus translated to relay coils $R_2$A0—$T_2$H7 activate appropriate ones of those coils, and the activated coils close relay contacts $r_2a0$—$t_2h7$. It is seen that the closing of relay contacts $r_2a0$—$t_2h7$ is accomplished in a manner similar to the operation of message data source 39 and originating register sender 42, but in reverse order therefrom.

The closing of relay contacts $r_2a0$—$t_2h7$ enables the transferring of data readout of message data source 39 in accordance with the telephone number dialed by subscriber 20 to relay coils $R_3$A0—$T_3$H7 of compiler 32 by contacts *sw*3. It is recalled that contacts *a*4 are closed in response to the received coded frequency signal, which contacts permit current to flow through relay SW3, thereby closing the contacts *sw*3 of switch 44. The closed relay contacts $r_2a0$—$t_2h7$ activate relay coils $R_3$A0—$T_3$H7 which operate relay contacts, not shown, to assemble a complete message from the message fragments read out of recording medium 34. If recording medium 34 is a magnetic tape recorder, the last-mentioned relay contacts may be included in well-known tape drive and readout apparatus. Prior to transmitting the assembled message to subscriber 20, compiler 32 suspends the ringback tone which was received by subscriber 20 after completing the dialing operation and while the above-described events were occurring, by operating response relay $E_3$ in incoming trunkline 27, response relay $E_2$ in outgoing trunkline 41 and response relay $E_1$ in incoming trunkline 31. Once the ringback tone is discontinued, the message assembled by compiler 32 is transmitted to subscriber 20 through contacts $sp_2$ which have been returned to position *a* when relay $E_3$ operates, common control switches 36', incoming trunkline 27, interoffice trunkline 19, contacts $sp_1$ which have been returned to position *a* when relay $E_2$ operates, outgoing trunkline 41, common control switches 36, incoming trunkline 31, and automatic switching equipment 30. In addition, the relay coils of originating register sender 42 as well as the relay coils of incoming register 43 are returned to their quiescent condition. It is seen that the communication channel between local office 11 and central office 12 is adapted for bidirectional transmission.

Although the invention has been particularly shown and described with reference to a telephone message-reporting system that may be used to apprise a subscriber of a changed telephone number, the time of day, or the weather forecast, depending upon the subscriber's request, the invention may be adapted for use by subscribers to a data processing service, a teleprinter service, etc. It will be obvious to those skilled in the art that the foregoing and various other changes and modifications in form and details may be made therein without departing from the spirit and scope of the invention. It is, therefore, the aim of the appended claims to cover all such changes and modifications.

What is claimed is:

1. A centralized message assembler for assembling selected messages in response to message request signals and for transmitting assembled messages to a plurality of locations, comprising:

first means at the centralized message assembler location for storing a plurality of fragments of said messages;

second means at the centralized message assembler location coupled to said first means and responsive to a plurality of said message request signals for assembling messages from said fragments and means for transmitting said messages from said second means to said locations;

third means at each of said locations for storing a plurality of data signals corresponding to a plurality of predetermined conditions;

fourth means at each of said locations coupled to said third means for reading out said stored data signals in response to the occurrence of said predetermined conditions so as to form said message request signals; and fifth means at each of said locations for producing said predetermined conditions and for receiving said transmitted messages.

2. The centralized message assembler of claim 1 wherein said centralized message assembler location is a telephone-switching system central office location and said plurality of locations are telephone-switching system local office locations; and wherein said fifth means comprises subscriber means and means for coupling said subscriber means to said means for storing said data signals and to said first location.

3. The centralized message assembler of claim 2 wherein said third means for storing said data signals comprises:

message data source means comprising a plurality of memory element means wherein said data signals are stored, said memory element means being operably connected to originating register sender means so that said data signals are transferred to said originating register sender means upon the occurrence of a corresponding predetermined condition.

4. The centralized message assembler of claim 3 wherein said second means comprises:

compiler means for assembling said messages;

means for receiving said message request signals; and means coupled to said compiler means and said means for receiving said messages request signals for controlling said compiler means in response to said received message request signals.

5. The centralized message compiler of claim 4 wherein said originating register sender means comprises relay means actuated by said transferred data signals, said relay means operably connected to said readout means;

and wherein said readout means comprises frequency generating means responsive to said actuated relay means such that a message request signal comprised of frequency-coded data signals is transmitted to said centralized message assembler location.

6. The centralized message assembler of claim 5 wherein said first means comprises magnetic recording means upon which are prerecorded verbal message fragments;

and wherein said compiler means assembles a complete verbal message by reading out said prerecorded message fragments, responsive to said means for controlling said compiler means.

7. The centralized message assembler of claim 6 wherein said means for coupling comprises first switch means coupled to said subscriber means;

first incoming trunkline means coupled to said switch means;

outgoing trunkline means coupled to said centralized message assembler location;

means for coupling said first incoming trunkline means to said outgoing trunkline means;

means for coupling said first incoming trunkline means to said memory element means so as to apprise said memory element means of the occurrence of said predetermined conditions;

and means for coupling said frequency generating means to said outgoing trunkline means for transmission of said frequency-coded data signals thereby.

8. The centralized message assembler of claim 7 wherein said means for receiving said message request signals comprises frequency signal receiving means for receiving said frequency-coded data signals and generating instruction signals responsive thereto;

second incoming trunkline means coupled to said outgoing trunkline means;

means for selectively coupling said second incoming trunkline means to said compiler means and to said frequency signal receiver means;

and means for applying said instruction signals to said means for controlling said compiler means whereby said compiler means assembles a complete message from said message fragments.

* * * * *